United States Patent Office 3,208,953
Patented Sept. 28, 1965

3,208,953
PARTICULATE SILICA AND METHOD
OF PRODUCTION
Donald L. Klass, Barrington, Thomas W. Martinek, Crystal Lake, and Charles T. O'Malley, Chicago, Ill., assignors to The Pure Oil Company, Chicago, Ill., a corporation of Ohio
No Drawing. Filed Mar. 5, 1962, Ser. No. 177,219
2 Claims. (Cl. 252—439)

This invention is directed to a new class of chemical compoitions, prepared by reacting silica particles which contain silanol groups on their surfaces with sulfur trioxide. The reaction product is a particulate silica characterized by a surface layer of acid sulfate groups.

Particulate silica is known to exist with various surface conditions. Thus the surfaces of the individual particles, including internal pore surfaces, may be characterized by the presence of siloxane groups, as

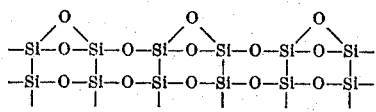

or by the presence of a mixture of siloxane and silanol groups, as

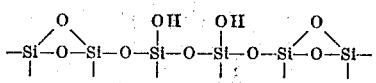

or by silanol groups to the substantial exclusion of siloxane groups. The silanol groups may be wholly or partially hydrated, as

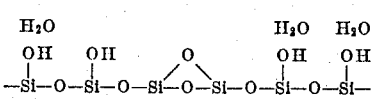

In this latter condition the water molecules are physically adsorbed rather than chemically combined, and are designated "free water."

In accordance with this invention, silanol silica, that is, silica having a surface condition characterized by the presence of silanol groups, is reacted with sulfur trioxide to form as a product silica having a surface characterized by the presence of acid sulfate groups.

It is therefore a primary object of this invention to provide a novel chemical composition. It is another object of this invention to provide particulate silica characterized by a surface which comprises a mono-layer of silica acid sulfate groups. Another object of this invention is to provide a method for preparing silica the surface of which is characterized by the presence of acid sulfate groups. Other objects of this invention will become apparent from the following description.

The silanol groups react with $SO_3$ to form acid sulfate groups as follows:

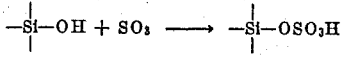

Although it could be expected that such a strong dehydrating agent as sulfur trioxide would eliminate water from silanol silica to form siloxane silica, it has been discovered that sulfur trioxide in fact reacts with the silanol groups on an equivalent basis. Thus the extent to which the surface of the product of the reaction is covered with a mono-layer of acid sulfate radicals is determined by the initial silica surface condition with respect to the presence of silanol groups. The product will thus be characterized by a surface layer consisting of siloxane and silica acid sulfate groups, the number of each depending upon the initial silica surface condition before reaction. The silica acid sulfate groups appear to be quite stable. No change of condition was detected when the sulfated silica was subjected to elevated temperatures and reduced pressures of such severity as would cause the destruction of silanol groups with the resulting formation of siloxane groups.

In carrying out the instant invention, it is preferred to contact a bed of silanol silica which is substantially devoid of free water with a gaseous atmosphere containing $SO_3$. The gaseous atmosphere preferably comprises a mixture of inert gas, such as nitrogen or air, and sulfur trioxide. Such an atmosphere can conveniently be prepared by bubbling nitrogen through fuming sulfuric acid. The gaseous atmosphere is passed through the bed of silanol silica until sulfur trioxide is detected in the effluent from the bed. When sulfur trioxide appears in the effluent atmosphere, the reaction is considered complete. A small amount of sulfur trioxide which has been adsorbed by the silica is then removed by passing through the bed an inert atmosphere, such as of air or nitrogen, until no sulfur trioxide appears in the effluent purging atmosphere. Alternatively, adsorbed sulfur trioxide can be removed by evacuation at a temperature of about 50 to 100° C. The reaction itself is exothermic and may be carried at temperatures in the range of ambient temperatures to about 200° C. The sulfur trioxide atmosphere can contain about 1 to 100% by volume of sulfur trioxide, and should be substantially free of moisture.

The extent of formation of acid sulfate groups at the surface of the silica particles, which is on an equivalent basis, is determined by the number of silanol groups on the silica surface before reaction. The maximum possible number of silanol groups is about 8 groups per square millimicron of silica surface area. Thus, by the method of this invention, zero to about 8 silica acid sulfate radicals can be formed per square millimicron of silica particle surface area, depending upon the condition of the silica before reaction. It is important that the silica before reaction contain little or substantially no free water. Sulfur trioxide reacts with the free water to form sulfuric acid, and the sulfuric acid is difficult to remove from the product silica acid sulfate. Also, excessive water tends to block the pores of the silica, with result that portions of the silica are isolated from the sulfur trioxide atmosphere, with the further result that these isolated surfaces are not sulfated. It is preferred that the silica starting material, which is substantially free of excess water, contain about 6 to 8, and still more preferably about 8, silanol groups per square millimicron of silica surface area, so that the product can be sulfated to the maximum degree. The silica itself may be porous or non-porous, and may be of high or low surface area per weight. Where the product is to be used as a catalyst, it is preferred that the silica starting material be of high surface area.

Example 1

As an example of the method of preparing acid-sulfate-radical-containing silica in accordance with this invention, 6.15 grams of silica having 6.8% by weight of chemically bound water (6.6 silanol groups per square millimicron of silica surface area), substantially devoid of free water, and having a surface area of 745 meters per gram was treated with gaseous sulfur trioxide. The sulfur trioxide was passed through the silica bed by passing a stream of nitrogen through liquid sulfur trioxide and then passing the gaseous stream into the silica bed. An exothermic reaction occurred and the depth of penetration of sulfur trioxide was determined by the temperature difference in the bed of silica. The reaction was completed when sulfur trioxide began to exit from the silica bed with the nitrogen. At this point, 5.5 grams of sulfur trioxide had been taken up by the silica. Physically adsorbed sulfur trioxide was then removed from the sulfated silica by passing pure nitrogen through the silica bed until sulfur trioxide could not be detected in the exit gases, leaving 4.3 grams of sulfur trioxide chemically bound to the silica. This quantity of sulfur trioxide corresponds to 1.05 molecules of sulfur trioxide per silanol group on the silica sample. Further proof of chemical reaction was obtained by heating the product at 100° C. and 0.5 millimeter of mercury for an extended period. No loss of weight from the sample was detected. If the silanol groups had remained unreacted, dehydration of the silica would have occured under these conditions of temperature and pressure.

*Example 2*

As another example of the method of this invention, a similar experiment was carried out using silica containing 5.2 silanol groups per square millimicron of surface area and having a surface area of 745 square meters per gram. A sulfur trioxide-nitrogen atmosphere was generated in the same manner and passed through the silica bed. Adsorbed sulfur trioxide was removed from the silica by purging with nitrogen. One molecule of sulfur trioxide was found to be reacted per silanol group.

*Example 3*

As a further example of the method of this invention, a sample of silica having 6.6 silanol groups per square millimicron of surface area, and a surface area of 745 square meters per gram, substantially devoid of free water, is treated with sulfur dioxide in the manner described in Example 1. The physically adsorbed sulfur trioxide is then removed from the sulfated silica by heating the sample to 150° C. at a pressure of 0.5 millimeter of mercury for a period of 1 hour. Sulfur trioxide in the amount of 1.6 grams is evolved from the silica sample.

It is contemplated that commercially available silicas may be employed in the method of this invention without pretreatment. Commercially available silicas will usually contain less than about 6 silanol groups per square millimicron of surface area, and usually will contain substantial amounts of free water. It is therefore preferred that free water in excess of about 1 or 2 molecules per square millimicron of the silica surface area be removed from the silica before contacting with sulfur trioxide. In this manner the formation of contaminating sulfuric acid is avoided. The reduction in water content can be achieved by heating the silica at temperatures above 100° C. in an open vessel. This will usually result in the concomitant destruction of some of the silanol groups on the silica, converting these groups to siloxane groups. After the removal of sufficient water, heating may be continued, if desired, to reduce the silanol content of the silica to any desired value.

Where the product sulfated silica is to contain more than about 5 silanol units per square millimicron of silica surface area, care must be exercised in the preparation of the silanol silica. Ordinarily, it will be necessary to treat the silica to increase the silanol content to the desired value. This is especially true where the silanol content is to be in the preferred range of about 6 to 8 radicals per square millimicron of silica surface area. The silanol content of silica can be increased to about 8 units by placing the silica in an aqueous slurry for a period of about 24 hours at ambient temperatures. The silica must then be dehydrated to reduce the water content to about 4 molecules per square millimicron of silica surface area. This dehydration must be done with care to avoid destruction of the silanol groups. Dehydration at elevated temperatures much in excess of 100° C. results in rather rapid destruction of silanol groups. Dehydration under evacuation at low temperatures results in a lesser destruction of silanol groups, and permits the production of silica having nearly 8 silanol units per square millimicron of surface area, and a tolerable free water content. In any event, when the silica is hydrated by contact with liquid water, agglomeration and rearrangement will occur so that the surface area of the silica may be substantially reduced.

It is therefore preferred that high-silanol-content silica of low free-water content be prepared as follows. In accordance with this method, the silanol content of silica containing less than the maximum number of possible silanol groups per unit surface area is increased by contacting the particulate silica with an atmosphere containing water vapor having a partial pressure greater than the partial pressure of water present on the silica until the total water content of the silica is increased to at least about 8 molecules of water per square millimicron of silica surface area. Sufficient time is then allowed for the siloxane-water reaction to become substantially complete. Free water may then be removed from the silica to leave the desired number of silanol groups on the silica surface, and the desired free-water content.

The reaction may be carried out at temperatures from ambient temperatures up to about 100° C. At room temperature, a practical silanol formation rate is achieved only when sufficient water is added to the silica surface to provide the stoichiometric amount necessary for the formation of the silanol groups plus nearly one molecule of water per silanol group. Thus to place upon the silica a surface coating of the maximum of about 8 silanol groups per square millimicron of surface area, it is necessary to adsorb onto the silica the stoichiometric amount of water (about 4 molecules per square millimicron) plus about one molecule of water per silanol group (8 molecules of water per square millimicron of surface area). In order to obtain the desired rapid rate of reaction, the silica, when treated at room temperature is contacted with a humid atmosphere until the water content is about the amount defined above, i.e., about 12 molecules of water per square millimicron of silica surface area. When the silica is treated at elevated temperatures, practical silanol formation rates are achieved at lower water contents. In general, the amount of water need be only sufficient to provide the stoichiometric amount of water for 8 silanol groups per square millimicron, plus about one-half molecule of water per silanol group. Thus, at elevated temperatures, the reaction will proceed to completion in a reasonable time when about 8 molecules of water have been adsorbed on the silica per square millimicron of silica surface area.

The silica is most conveniently hydrated by contacting it with an atmosphere containing water vapor at a partial pressure in excess of the partial pressure of water on the silica. Preferably, the atmosphere will be substantially saturated with water vapor, the atmosphere containing a gas such as nitrogen or air to act as a carrier. The extent of hydration of the silica can readily be determined by the weight increase of the sample. When the silica has been hydrated to the desired extent, it is permitted to age so the siloxane-water reaction can take place. During this time the adsorbed water must not be permitted to evaporate from the silica. This can most easily be accomplished by sealing the silica sample in a closed vessel. At ambient temperatures, the aging period for complete reaction is less than 6 days when about 12 molecules of water per square millimicron of silica surface area have been absorbed. When lesser amounts of water have been adsorbed, the reaction period will be about 7 to 12 days, the aging period being about 12 days for a water content of about 8 molecules per square millimicron of surface area. When the reaction occurs at elevated temperatures of about 150 to 160° C., a period of less than 6 days is sufficient for a water content of about 8 molecules per square millimicron of silica surface area.

Silica processed as aforedescribed will have a silanol content of about 8 groups per square millimicron of silica surface area, and will in addition contain free water in the amount of at least about four molecules per square millimicron of silica surface area. It is therefore desirable to partially dehydrate the silica to place the free water content in the preferred range, but this must be done without substantially decreasing the silanol content of the silica.

The prior art teaches that the silanol content of silica will not be reduced by dehydration carried out at temperatures as high as 160° C. Unfortunately, it has been found that contrary to this prior art teaching, at least part of the chemically bound silanol water is removed at a significant rate even at temperatures as low as 100° C., unless certain critical conditions are maintained. It has further been found that if the dehydration is carried out by evacuation, the decomposition of silanol groups can occur at even lower temperatures.

It has been found that silica containing about 8 silanol groups per square millimicron of surface area can be dehydrated to the point at which substantially all free water has been removed, without the destruction of silanol groups, by dehydration at a temperature in the range of about 100° to 110° C., provided that the atmosphere above the silica is maintained at a water vapor pressure in very slight excess of the water vapor pressure of silica having the desired 8 silanol groups per square millimicron at the prevailing temperature. This is most conveniently accomplished by heating the silica to a temperature within the range of 100° to 120° C., in a substantially closed vessel having outlet means sufficient to prevent the build-up of pressure within the vessel. Thus the atmosphere within the vessel, which may comprise air and water vapor, is nearly saturated with water vapor, and the vapor pressure of the water in the atmosphere nearly equals that of the vapor pressure of the 8 silanol groups per square millimicron bonded to the silica when dehydration essentially stops. This technique is apparently made possible by the fact that in the temperature range of about 100° to 120° C., there is substantially no overlap of the equilibrium vapor pressure range of the silanol groups, which is a function of the number of silanol groups existing per surface area, and the equilibrium vapor pressure of the free-water content of the silica, which is a function of the number of free-water molecules present per unit surface area. In other words, silica having 8 silanol groups per square millimicron plus free water, when heated to 100 to 120° C. in its own water vapor atmosphere (closed vented vessel), approaches equilibrium with water vapor at about 100° to 120° C. when the water content of the silica has been reduced to 4 to 5 molecules total water content per square millimicron of silica surface area.

A series of experiments was run to demonstrate this dehydration technique. In this series of experiments, a 745-square-meter-per-gram silica was hydrated to a water content of about 21 weight percent (equivalent to 8 silanol groups plus about 8 molecules of free water), and then was divided into several portions and place in Petri dishes. The dishes were covered with aluminum foil which was sealed around the dish by means of a soft wire. Then the dishes were placed in an oven at 101°, plus or minus 1° C., and maintained at that temperature for various lengths of time. Finally, the water contents of the partialy dehydrated samples were determined by heating weighed portions of the samples at 1000° C. for three hours, to determine the volatile content thereof. The results were as follows:

TABLE I

| Sample Number | Hours at 101° C. | Final Water Content (percent W.) |
| --- | --- | --- |
| 1 | 20 | 16.78 |
| 2 | 26 | 14.92 |
| 3 | 32 | 12.55 |
| 4 | 38 | 16.78 |
| 5 | 44 | 12.74 |
| 6 | 50 | 10.69 |
| 7 | 56 | 10.91 |
| 8 | 62 | 10.46 |
| 9 | 62 | 10.07 |
| 10 | 62 | 10.05 |
| 11 | 68 | 10.14 |

It is apparent that the dehydration stopped at a water content of about 10.1% by weight at 101° C. (about 8 silanol groups plus one molecule of free water for this silica) when the silica was in contact with its equilibrium atmosphere.

In another experiment, the temperature was maintained at 110° plus or minus 2° C. At the end of 56 hours, the water content of the sample, determined as above described, had diminished to 8.39% by weight, and at the end of 75 hours the water content still was 8.09% by weight, indicating that water removal at 110° C. under an equilibrium atmosphere had practically ceased with a substantial removal of all free water from the sample, without a substantial decrease in the silanol content of the sample. The remaining water content was about equal to the 8.2% water required for 8 silanol groups per square millimicron of surface area on the tested silica having a surface area of about 745 meters per gram.

The product silicia acid sulfate particles are useful as catalysts, for example, for the polymerization of gaseous olefins to liquid olefins. Specifically, propene has been polymerized to produce $C_9$ to $C_{12}$ liquid olefins.

The embodiments of the invention in which an exclusive property or privilege is claimed are defined as follows:

1. The method of producing particulate silica having a surface mono-layer comprising acid sulfate radicals which comprises contacting particulate silica at a temperature up to about 100° C. with an atmosphere containing water vapor having a partial pressure greater than the partial pressure of water present on the particulate silica until the water content of said silica is at least about 12 molecules of water per square millimicron of silica surface area, aging the resultant hydrated silica to promote the formation of silanol groups on the surface thereof, dehydrating the resultant hydrated silica by heating same to a temperature of about 100° C. to 120° C. in the presence of an atmosphere containing water vapor at a vapor pressure in excess of the water vapor pressure of silica having 6 to 8 silanol groups per square millimicron of surface and reacting the resultant silanol silica having about 6 to 8 silanol groups per square millimicron of surface area and less than about 2 molecules of free water per square millimicron of surface area with sulfur trioxide at a temperature in the range of ambient temperature to about 200° C. until unreacted sulfur trioxide is detected in the effluent atmosphere.

2. Particulate silica having a surface mono-layer comprising about 6 to 8 silica acid sulfate radicals per square millimicron of silica surface area, produced by contacting particulate silica at a temperature up to about 100° C. with an atmosphere containing water vapor having a partical pressure greater than the partial pressure of water present on the particulate silica until the water content of said silica is at least about 12 molecules of water per square millimicron of silica surface area, aging the resultant hydrated silica to promote the formation of silanol groups on the surface thereof, dehydrating the resultant hydrated silica by heating same to a temperature of about 100° C. to 120° C. in the presence of an atmosphere containing water vapor at a vapor pressure in excess of the water vapor pressure of silica having 6 to 8 silanol groups per square millicimron of surface and reacting the resultant silanol silica having about 6 to 8 silanol groups per square millimicron of surface area and less than about 2 molecules of free water per square millimicron of surface area with sulfur trioxide at a temperature in the range of ambient temperature to about 200° C. until unreacted sulfur trioxide is detected in the effluent atmosphere.

References Cited by the Examiner

UNITED STATES PATENTS 2,657,149  10/53  Iler.
2,848,422  8/58  Donovan et al. _____ 252—440

OTHER REFERENCES

Szmant et al.: "Journal of American Chemical Society," vol. 73, July 1951, pages 3095–3061.

MAURICE A. BRINDISI, *Primary Examiner.*